(12) United States Patent
Kodi et al.

(10) Patent No.: US 9,710,297 B2
(45) Date of Patent: *Jul. 18, 2017

(54) DYNAMIC ALLOCATION AND ASSIGNMENT OF VIRTUAL ENVIRONMENT

(71) Applicant: Microsoft Technology Licensing, LLC, Redmond, WA (US)

(72) Inventors: Sai Gopal Kodi, Bothell, WA (US); Edhi Sarwono, Redmond, WA (US); Sanjeeb Sarangi, Bothell, WA (US); Frank Zakrajsek, Carnation, WA (US); Luis Camara Manoel, Maple Valley, WA (US); Suveen Kumar Reddy Vuppala, Issaquah, WA (US); Anupama Vedapuri, Issaquah, WA (US); Deepak Munjal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/574,268

(22) Filed: Dec. 17, 2014

(65) Prior Publication Data

US 2015/0186176 A1    Jul. 2, 2015

Related U.S. Application Data

(63) Continuation of application No. 12/917,352, filed on Nov. 1, 2010, now Pat. No. 8,924,964.

(51) Int. Cl.
*G06F 9/455*    (2006.01)
*G06F 9/50*    (2006.01)

(52) U.S. Cl.
CPC ........ *G06F 9/45558* (2013.01); *G06F 9/5027* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS 7,213,065 B2    5/2007    Watt
7,603,671 B2    10/2009    Liu
(Continued)

OTHER PUBLICATIONS

"CA Data Center Automation Manager and VMware vCenter Server", Partner Product Brief: CA and VMware, retrieved Jul. 29, 2010, 1-9.

(Continued)

*Primary Examiner* — Kenneth Tang
(74) *Attorney, Agent, or Firm* — Baker & Hostetler LLP

(57) ABSTRACT

A mechanism for enabling enterprise data centers to allocate portions of their infrastructure and assign them to specific line of business unit IT organizations. The mechanism allows the business unit to dynamically and rapidly provision virtual infrastructure as needed to run line of business applications. This can also enable the business unit to focus more on the development and management of the applications rather than invest significant resources in managing the infrastructure layer. In various embodiments, data center administrators may be enabled to allocate and assign a portion of their physical infrastructure (Storage, Network and Compute) and expose them as a virtualized environment to different business unit organizations.

20 Claims, 12 Drawing Sheets

(56) References Cited

U.S. PATENT DOCUMENTS

| | | |
|---|---|---|
| 7,689,800 B2 | 3/2010 | Oshins et al. |
| 7,912,822 B2 | 3/2011 | Bethlehem et al. |
| 7,941,510 B1 | 5/2011 | Tormasov et al. |
| 8,171,485 B2 * | 5/2012 | Muller .................. G06F 9/5027 709/223 |
| 8,223,371 B2 | 7/2012 | Kamiya |
| 8,924,964 B2 * | 12/2014 | Kodi .................. G06F 9/45558 718/1 |
| 2002/0147777 A1 * | 10/2002 | Hackbarth ........... G06Q 10/107 709/205 |
| 2004/0015408 A1 * | 1/2004 | Rauen, IV ............. G06Q 10/10 705/26.41 |
| 2005/0273272 A1 * | 12/2005 | Brando .................. G06Q 10/06 702/19 |
| 2007/0156695 A1 | 7/2007 | Lim |
| 2007/0180447 A1 | 8/2007 | Mazzaferri et al. |
| 2007/0180448 A1 | 8/2007 | Low et al. |
| 2008/0060051 A1 * | 3/2008 | Lim .................... G06F 17/3089 726/1 |
| 2009/0276771 A1 | 11/2009 | Nickolov et al. |
| 2010/0138830 A1 | 6/2010 | Astete et al. |
| 2011/0029441 A1 | 2/2011 | Gupta et al. |
| 2011/0125894 A1 * | 5/2011 | Anderson ............. H04L 9/3213 709/224 |
| 2011/0126197 A1 * | 5/2011 | Larsen .................. H04L 9/3213 718/1 |
| 2011/0214176 A1 * | 9/2011 | Burch ..................... G06F 9/455 726/15 |

OTHER PUBLICATIONS

"Cisco and VMware Accelerate Innovation in Data Center Virtualization", www.vmware.com-company-news-releases-cisco.sub.--vmworld08.html, accessed Jul. 29, 2010, 2 pages.

"Dynamic Server Infrastructure", Design Guide, Fujitsu, retrieved Jul. 29, 2010, 1-8.

"Effectively Managing Change Across the Data Center", bmc Software, retrieved Jul. 29, 2010, 12 pages.

"Enterasys Data Center Networking", Enterasys, retrieved Jul. 29, 2010, 7 pages.

"Microsoft System Center Virtual Machine Manager Self-Service Portal 2.0 Release Candidate", www.microsoft.com-downloads-en-details.aspx?FamilyID=fef38539-ae5a-462b-b- 1c9-9a02238bb8a7&displaylang=en, accessed Jul. 29, 2010, 4 pages.

"Virtualization Management", www-01.ibm.com-software-tivoli-solutions-virtualization-management-, Tivoli Software, IBM, accessed Jul. 29, 2010, 4 pages.

Townsend, "Automating the Virtual Data Center", www.tek-tips.nethawk.net-blog-automating-the-virtual-data-center, Tek Tips Whitepaper Library, accessed Jul. 29, 2010, 3 pages.

* cited by examiner

DYNAMIC ALLOCATION AND ASSIGNMENT OF VIRTUAL ENVIRONMENT

CROSS REFERENCE TO RELATED APPLICATIONS

This application is a continuation of U.S. patent application Ser. No. 12/917,352, filed Nov. 1, 2010, now U.S. Pat. No. 8,924,964, issued Dec. 30, 2014, the entire contents of which are incorporated herein by reference.

BACKGROUND

Information technology (IT) organizations of many enterprises are continuing to move toward centralization and consolidation of their computing resources within datacenters as bandwidth is becoming more abundant, the cost of hardware has declining, and the density of computing has increased dramatically at all levels—chip, rack and datacenter. The number of specialized Line of Business (LOB) applications and services continue to increase significantly within IT organizations. At the same time, people and process related costs continue to spiral upward. Furthermore, recent regulatory requirements have mandated much tighter governance over corporate data. As a result of these competing pressures, the majority of IT organizations are increasing the capacity of their data centers, collapsing branch office servers back into the data centers, implementing tighter centralized control over critical data and applications, and automating the operations of the data center.

One increasingly popular form of networking used by enterprises may generally be referred to as remote presentation systems, which can use protocols such as Remote Desktop Protocol (remote presentation) to share a desktop and other applications executing on a server with a remote client. Such computing systems typically transmit the keyboard presses and mouse clicks or selections from the client to the server, relaying the screen updates back in the other direction over a network connection. As such, the user has the experience as if his or her machine is operating entirely locally, when in reality the client device is only sent screenshots of the desktop or applications as they appear on the server side.

Some enterprises that provide virtual machines to their users are purchasing computing capacity from public cloud providers. The cloud providers may use virtualization hosts to deploy virtual machines and sell virtual machines to the enterprise tenants. The virtualization hosts in the enterprise data center may be joined to the cloud provider's domain, whereas the tenant owns the actual virtual machines. Providing remote services through the cloud provider may provide some benefits such as:

SUMMARY

Many principles and operations based on the cloud data infrastructure model may be applied to enterprise data centers. Such principles may include image based management, rapid and dynamic provisioning of resources, service/application centric management, etc. By application of such principles in their data centers, a paradigm shift in how enterprise IT organizations operate may be enabled.

Disclosed herein are methods and systems that enable enterprise data centers to allocate portions of their infrastructure and assign them to specific line of business (LOB) business unit IT (BUIT) organizations. This allows the BUIT to dynamically and rapidly provision virtual infrastructure as needed to run LOB applications. This can also enable the BUIT to focus more on the development and management of the LOB applications rather than invest significant resources in managing the infrastructure layer.

In various embodiments, methods and systems are disclosed for enabling data center administrators to allocate and assign a portion of their physical infrastructure (Storage, Network and Compute) and expose them as a virtualized environment to different business unit organizations.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for allocating storage, network and computing infrastructure as a virtualized computing environment to a plurality of user groups in accordance with this specification are further described with reference to the accompanying drawings in which.

DETAILED DESCRIPTION

Computing Environments in General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 1:
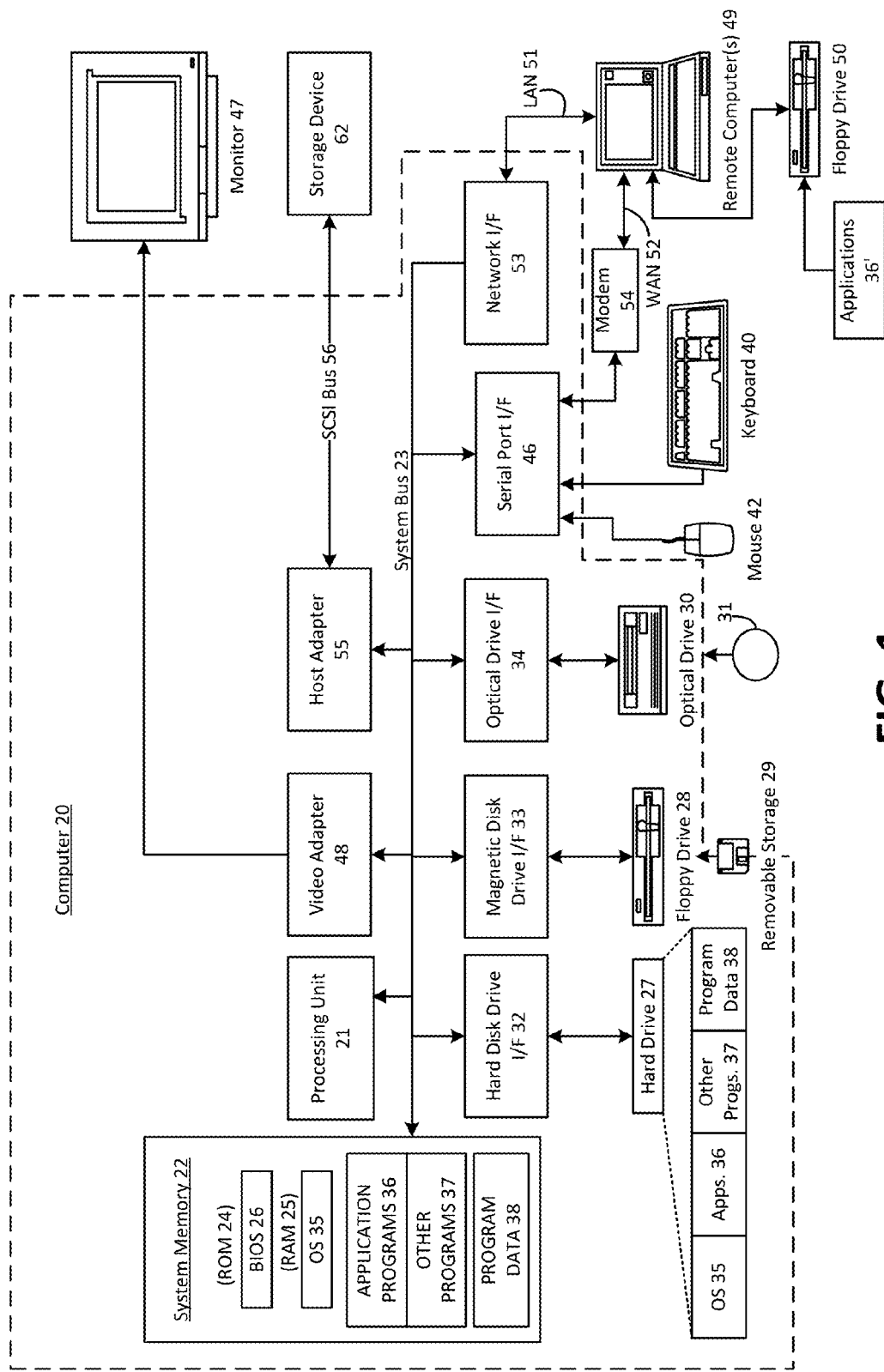
FIGS. 1 and 2 depict an example computer system wherein aspects of the present disclosure can be implemented.
Figure 2:
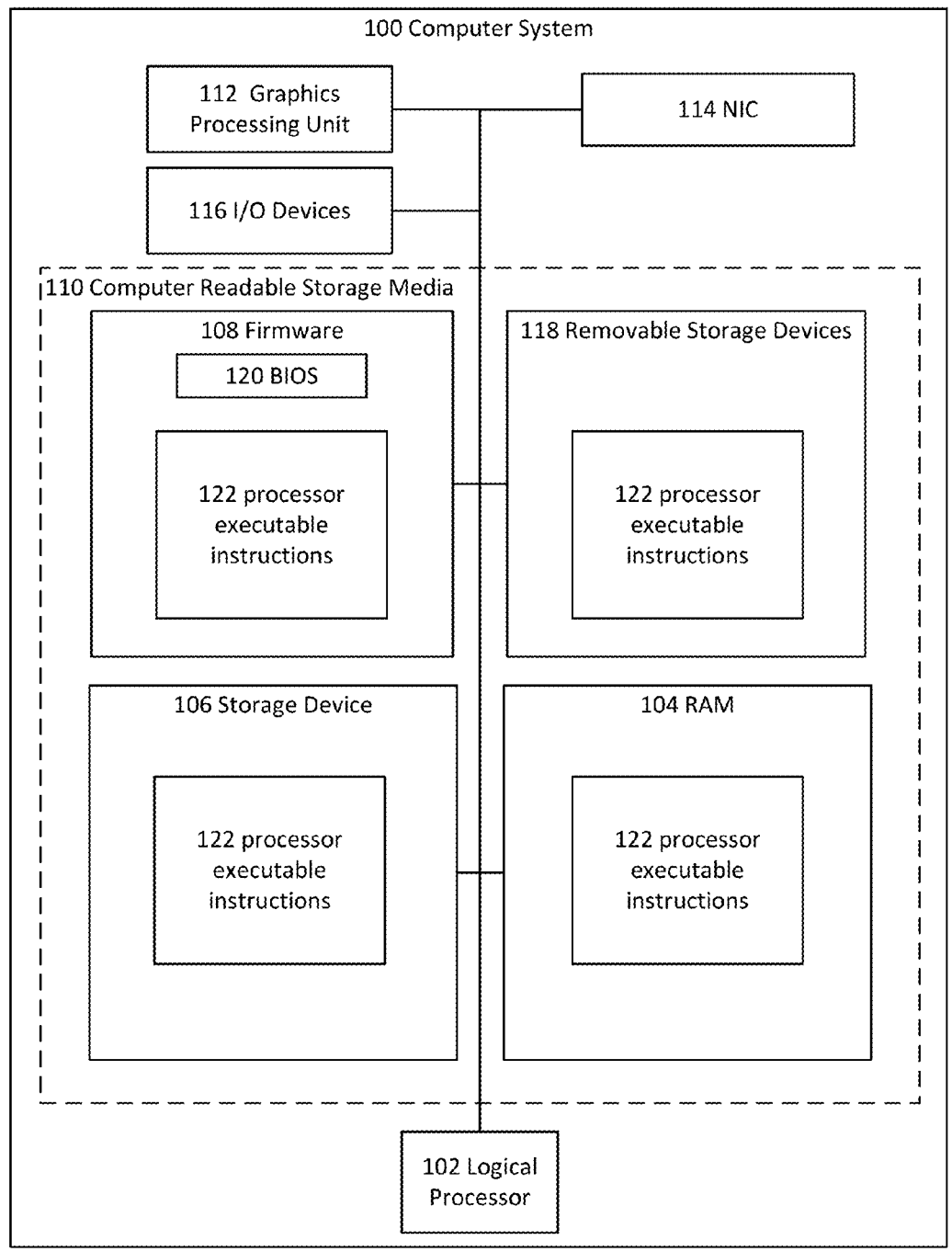

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (remote presentation)) to an application on a terminal server. The application processes the input as if the input were entered at the terminal server. The application generates output in response to the received input and the output is transferred over the network to the client Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non-volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges.

The computer readable storage media provide non-volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (remote presentation)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the remote presentation protocol by allowing plug-ins to transfer data over a remote presentation connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
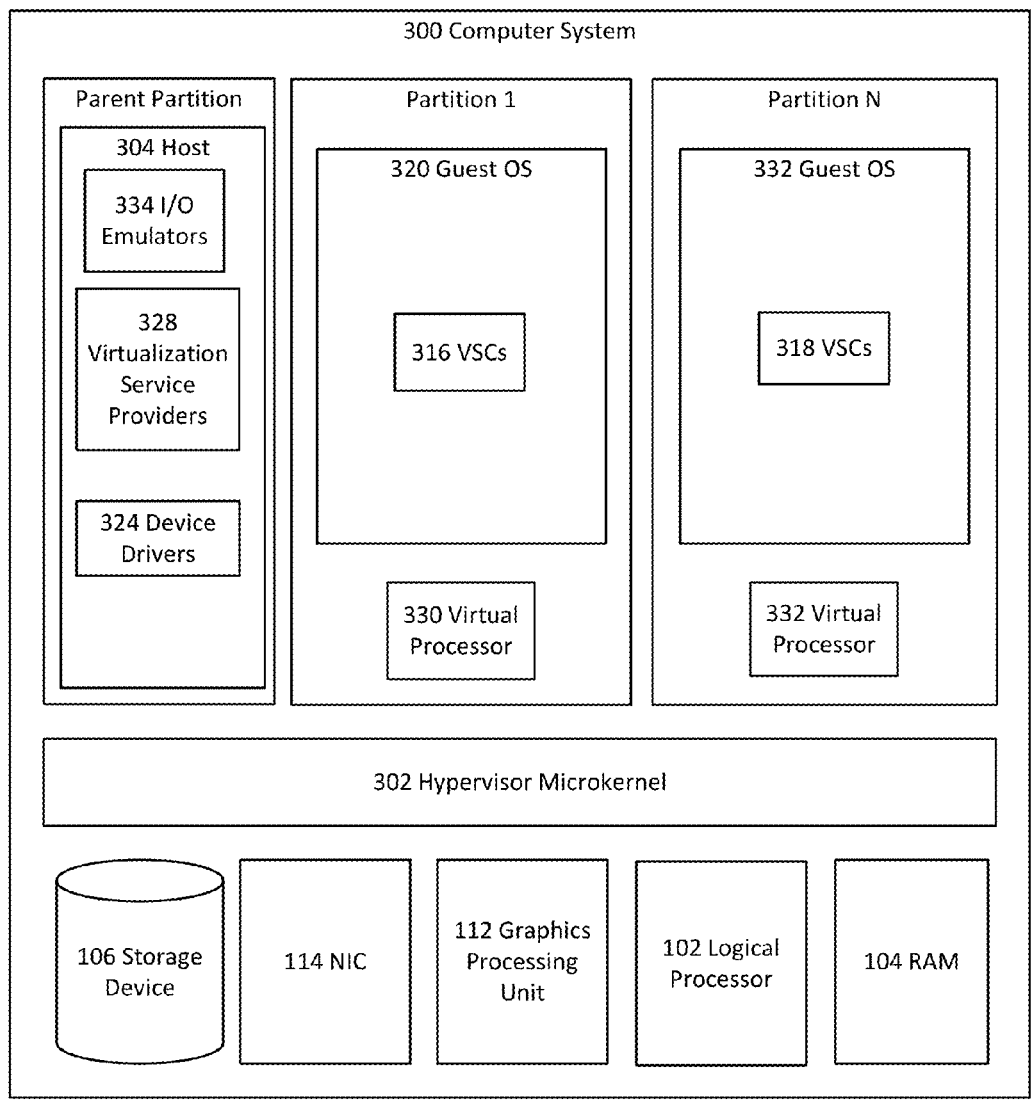
FIG. 3 depicts an operational environment for practicing aspects of the present disclosure.

Turning to FIG. 3, illustrated is an exemplary virtual machine server that can be used to generate virtual machines. In this embodiment, hypervisor microkernel 302 can be configured to control and arbitrate access to the hardware of computer system 300. Hypervisor microkernel 302 can isolate processes in one partition from accessing another partition's resources. For example, hypervisor microkernel 302 can generate execution environments called partitions such as child partition 1 through child partition N (where N is an integer greater than 1). In this embodiment, a child partition is the basic unit of isolation supported by hypervisor microkernel 302. Each child partition can be mapped to a set of hardware resources, e.g., memory, devices, logical processor cycles, etc., that is under control of the hypervisor microkernel 302. In embodiments hypervisor microkernel 302 can be a stand-alone software product, a part of an operating system, embedded within firmware of the motherboard, specialized integrated circuits, or a combination thereof Hypervisor microkernel 302 can enforce partitioning by restricting a guest operating system's view of the memory in a physical computer system. When hypervisor microkernel 302 instantiates a virtual machine, it can allocate pages, e.g., fixed length blocks of memory with starting and ending addresses, of system physical memory (SPM) to the virtual machine as guest physical memory (GPM). In this embodiment, the guest's restricted view of system memory is controlled by hypervisor microkernel 302. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 304. Host 304 can be an operating system (or a set of configuration utilities) and host 304 can be configured to provide resources to guest operating systems executing in the child partitions 1-N by using virtualization service providers 328 (VSPs). VPSs 328, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 328 to communicate with virtualization service clients 316 and 318 can be thought of as the virtualization path.

As shown by the figure, emulators 334, e.g., virtualized IDE devices, virtualized video adaptors, virtualized NICs, etc., can be configured to run within host 304 and are attached to resources available to guest operating systems 330 and 322. For example, when a guest OS touches a memory location mapped to where a register of a device would be or memory mapped to a device, microkernel hypervisor 302 can intercept the request and pass the values the guest attempted to write to an associated emulator. The resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (320 and 322) that guest operating systems (320 and 322) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (320 and 322) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 4:
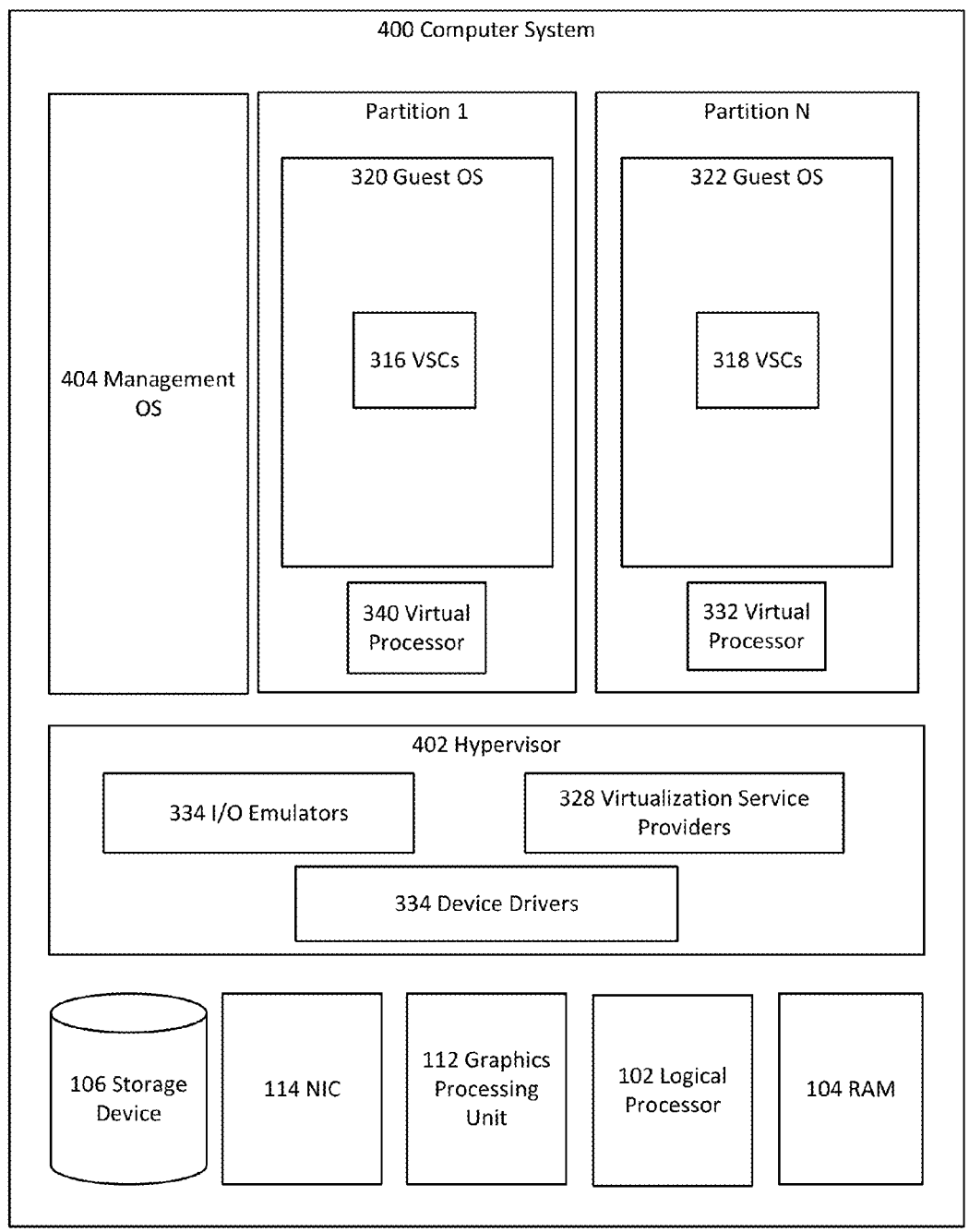
FIG. 4 depicts an operational environment for practicing aspects of the present disclosure.

Referring now to FIG. 4, illustrated is a virtual machine server based on an alternative architecture. FIG. 4 depicts similar components to those of FIG. 3; however, in this example embodiment hypervisor 402 can include a microkernel component and components similar to those in host 304 of FIG. 3 such as the virtualization service providers 328 and device drivers 324, while management operating system 404 may contain, for example, configuration utilities used to configure hypervisor 402. In this architecture, hypervisor 402 can perform the same or similar functions as hypervisor microkernel 302 of FIG. 3; however, in this architecture hypervisor 404 can be configured to provide resources to guest operating systems executing in the child partitions. Hypervisor 402 of FIG. 4 can be a stand alone software product, a part of an operating system, embedded within firmware of the motherboard or a portion of hypervisor 402 can be effectuated by specialized integrated circuits.

Figure 5:
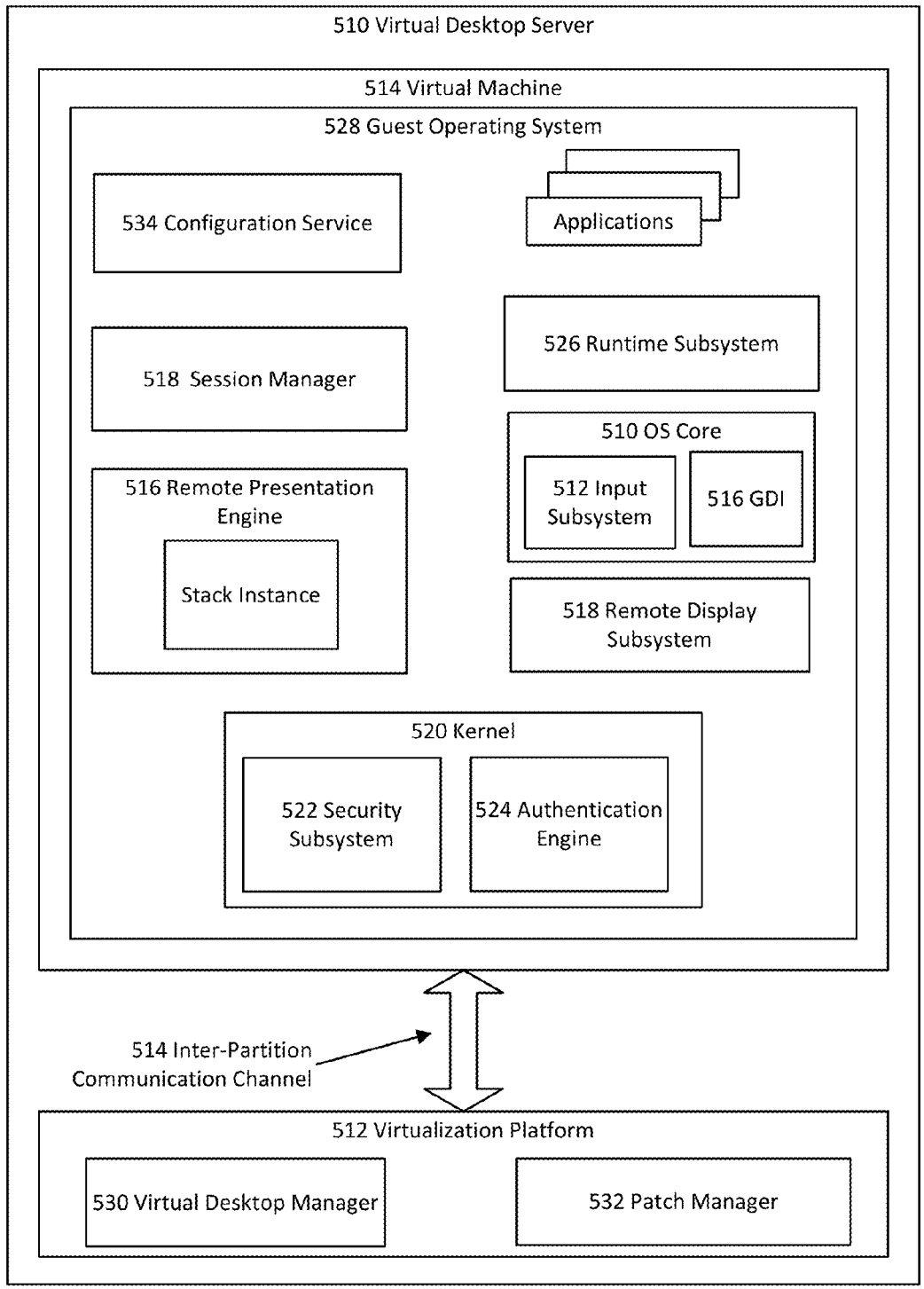
FIG. 5 illustrates a computer system including circuitry for effectuating remote desktop services.

Turning now to FIG. 5, illustrated is a high-level block diagram of virtual desktop server 500. In an embodiment, virtual desktop server 500 can be configured to deploy virtual desktop sessions (VDS) to clients, e.g., mobile devices such as smart phones, computer systems having components similar to those illustrated in FIG. 1, etc. Briefly, virtual desktop technology allows a user to remotely interact with a guest operating system running in a virtual machine. Unlike a remote desktop session, in a virtual desktop session only one user is logged into a guest operating system and can have total control of it, e.g., the user can run as an administrator and can have full rights on the guest. In the illustrated example, virtual desktop server 500 can have components similar to computer system 300 or 400 of FIG. 3 or FIG. 4. In the illustrated example, virtualization platform 502 is a logical abstraction of virtualization infrastructure components described above in FIG. 3 and FIG. 4. The functionality described in the following sections as "within" virtualization platform 502 can be implemented in one or more of the elements depicted in FIG. 3 or FIG. 4. For example, virtual desktop manager 530 could be implemented in a host 304 of FIG. 3. More specifically, virtual desktop manager 530 could be implemented in a host operating system running in the parent partition.

Starting a virtual desktop session requires instantiation of a guest operating system within a virtual machine. In an exemplary embodiment, virtual desktop manager 530, e.g., a module of processor executable instructions, can start up virtual machine 514 (along with guest operating system 528) in response to a request. Virtual desktop manager 530 can execute on a logical processor and instruct virtualization platform 502, e.g., microkernel hypervisor 202, to allocate memory for a partition. Virtualization platform 502 can execute and set virtual devices up within virtual machine 514 and load a boot loader program into virtual machine memory. The boot loader program can execute on a virtual processor and load guest operating system 528. For example, session manager 508 can be loaded, which can instantiate environment subsystems such as runtime subsystem 526 that can include a kernel mode part such as operating system core 510. For example, the environment subsystems in an embodiment can be configured to expose a subset of services to application programs and provide an access point to kernel 520. When guest operating system 528 is loaded, the boot loader program can exit and turn control of the virtual machine over to guest operating system 528. Guest operating system 528 can execute the various modules illustrated in FIG. 5 and configure itself to host a virtual desktop session. For example, guest operating system 528 can include registry values that cause remote presentation engine 506 and/or configuration service 534 to start upon boot.

A virtual desktop session can start when guest operating system 528 receives a connection request over a network from a client. A connection request can first be handled by remote presentation engine 506. The remote presentation engine 506 can be configured to listen for connection messages and forward them to session manager 508. As illustrated by FIG. 3, when sessions are generated the remote presentation engine 506 can run a protocol stack instances for the session. Generally, the protocol stack instance can be configured to route user interface output to an associated client and route user input received from the associated client to operating system core 510. Briefly, operating system core 510 can be configured to manage screen output; collect input from keyboards, mice, and other devices.

A user credential, e.g., a username/password combination, can be received by remote presentation engine 506 and passed to session manager 508. Session manager 508 can pass the credential to a logon procedure, which can route the credential to authentication engine 524 for verification. Authentication engine 524 can generate a system token, which can be used whenever a user attempts to execute a process to determine whether the user has the security credentials to run the process or thread. For example, when a process or thread attempts to gain access, e.g., open, close, delete, and/or modify an object, e.g., a file, setting, or an application, the thread or process can be authenticated by security subsystem 522. Security subsystem 522 can check the system token against an access control list associated with the object and determine whether the thread has permission based on a comparison of information in the system token and the access control list. If security subsystem 522 determines that the thread is authorized then the thread can be allowed to access the object.

Continuing with the description of FIG. 5, in an embodiment the operating system core 510 can include a graphics display interface 516 (GDI) and input subsystem 512. Input subsystem 512 in an example embodiment can be configured to receive user input from a client via the protocol stack instance for the virtual desktop session and send the input to operating system core 510. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the operating system core 510 and the input subsystem 512 can be configured to determine that an icon is located at the coordinates associated with the double-click. Input subsystem 512 can then be configured to send a notification to runtime subsystem 526 that can execute a process for the application associated with the icon.

Draw commands can be received from applications and/or a desktop and processed by GDI 516. GDI 516 in general can include a process that can generate graphical object draw commands. GDI 516 in this example embodiment can be configured to pass the commands to remote display subsystem 518 that can instantiate a display driver for the session. In an example embodiment remote display subsystem 518 can be configured to include virtual display driver(s) that can be configured to receive the draw commands and send them to the client.

Also shown in FIG. 5 is a configuration service 534. In an exemplary embodiment, configuration service 534 can be used to setup guest operating system 528 to conduct virtual desktop sessions prior to connection by a client. For example, configuration service 534 can run within guest operating system 528 and be executed when guest operating system 528 boots. Since certain configuration settings require administrative privileges, configuration service 534 can be configured to run as a process with system wide privileges. Some of the exemplary actions configuration service 534 can take include, but are not limited to, actions that add an account identifier for the user to a list of administrative users for guest operating system 528, add the account identifier to a list of authorized virtual desktop users, set registry values, open guest operating system firewalls, and open the port that remote presentation engine 506 listens for connections on. Configuration service 534 is described in more detail in the following paragraphs.

In an exemplary embodiment, a communication channel can be established between virtualization platform 502 and guest operating system 528 in order to configure and control guest operating system 528. Since a remote user can have complete control of virtual machine 514, security needs to be in place to ensure that any channel used to configure and control guest operating system 528 can not also be used to attack virtualization platform 502 or other computer systems connected to an internal network. Traditionally, a networked communication channel is used to setup and control guest operating system 528. Network channels, however are difficult to deploy when guest operating system 528 is not in the same network domain as virtualization platform 502 and virtualization platform 502 is configured to deny incoming connection requests from outside the domain.

In an exemplary embodiment, inter-partition communication channel 504 can be used to communicate with configuration server 534 in order to configure and/or manage the virtual desktop session. Inter-partition communication channel 504 can be configured to be implicitly trusted by virtual machine 514 and not trusted by virtualization platform 502. In this example, information, e.g., data and/or commands can be easily routed to guest operating system 528 without any need to verify the information. On the other hand, data received from virtual machine 514 can be verified and authenticated before virtualization platform 502 takes an action. Moreover, because inter-partition communication channel 504 does not use networking, guest operating system 528 can be kept off the internal network.

Inter-partition communication channel 504 can be implicitly trusted by virtual machine 514, i.e., information received via the channel is inherently authenticated/validated, because only virtualization platform 502 can create inter-partition communication channel 504. For example, in an embodiment inter-partition communication channel 504 can be implemented at least in part as a region of memory shared between virtual machine 514 and virtualization platform 502. Virtualization platform 502 can cause a data structure indicative of a ring buffer or the like to be created in region of shared memory that can be used as a full-duplex communication channel between virtualization platform 502 and virtual machine 514. In an exemplary embodiment, the inter-partition communication channel can include features described in U.S. Pat. No. 7,689,800 entitled "Partition bus," the contents of which are herein incorporated by reference in its entirety.

Virtualization platform 502 can write information to inter-partition communication channel 504 that can be read by virtual machine 514. In an exemplary embodiment, inter-partition communication channel 504 can be message based. That is, virtualization platform 502 and virtual machine 514 can be configured to write packets of data to inter-partition communication channel 504. In the same, or another exemplary embodiment, inter-partition communication channel 504 can be event driven. In this configuration, when information is written to the channel, the receiver can be instructed to read the information from inter-partition communication channel 504 by for example, hypervisor 302 of FIG. 3.

Figure 6:
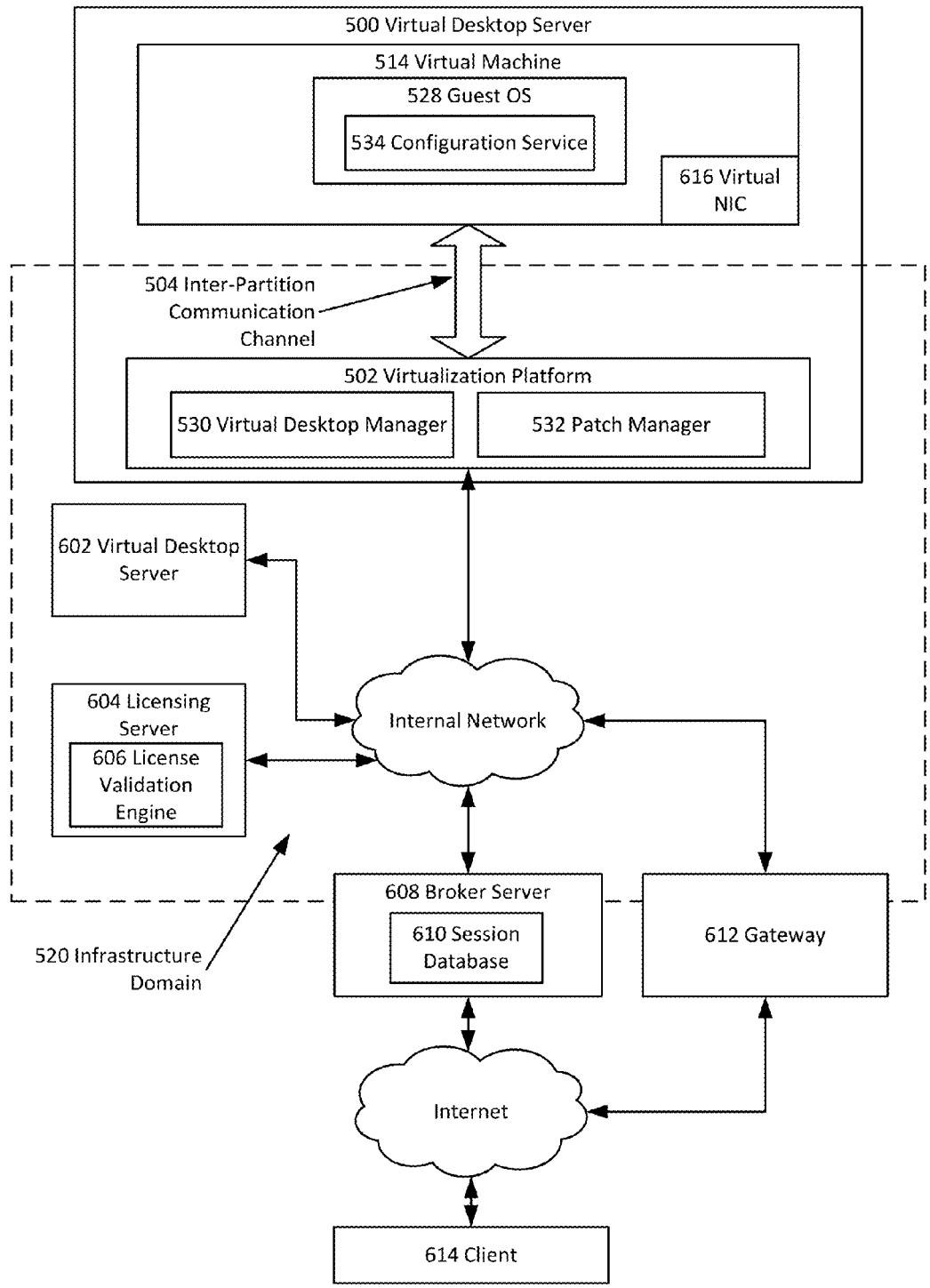
FIG. 6 depicts an operational environment for practicing aspects of the present disclosure.

Turning now to FIG. 6, illustrated is a high-level block diagram of a datacenter including virtual desktop server 500, virtual desktop server 602, licensing server 604, broker server 608, gateway 612, and client 614. The datacenter can be configured to deploy virtual desktop sessions to clients. In the illustrated example, virtualization platform 502, virtual desktop server 602, licensing server 604, broker server 608, and gateway 612 can be part of an intranet and the user credentials used to log into these computers can be members of the same domain, i.e., the infrastructure domain 520. Infrastructure domain 520 is shown in dashed lines cutting virtual desktop server 500 in half to illustrate that in an exemplary embodiment, virtual machine 514 can be part of a different domain or part of no domain.

The datacenter can include an internal network coupling a plurality of virtual desktop servers (602 and 500), which can include components similar to those illustrated by FIG. 3 or 4, to broker server 608 and licensing server 604. As one of skill in the art can appreciate, while two virtual desktop servers are shown the datacenter can have many more. Also, while virtual desktop server 500 is illustrated running one virtual machine (514), each virtual desktop server can simultaneously host many virtual machines. Or put another way, the datacenter can have M (where M is an integer greater than 1) virtual desktop servers and each of the M virtualization hosts can host N (where N is also an integer greater than 1) virtual machines.

Broker server 608 can act as an interface to the intranet for client 614. Briefly, broker server 608 can include components similar to the components described with respect to FIG. 2. Broker server 608 can have a network adapter that interfaces it to a public network, such as the Internet, and another network adapter that interfaces it to the internal network, i.e., the intranet. In this example, broker server 608 can act as a gateway for the internal network, thereby allowing virtual desktop servers and licensing server 604 to be kept off the public network.

When user of client 614 wants a virtual desktop session, he or she can click on an icon and client 614 can send one or more packets of information to broker server 608. Broker server 608 can include a module of software instructions that upon execution cause a logical processor to select a suitable virtualization host to instantiate a virtual machine to host the virtual desktop session. A user credential, e.g., a username and password combination, can be collected and broker server 608 can check session database 610 to determine whether the datacenter includes any disconnected virtual desktop sessions associated with the user credential such as a username/password combination. If session database 610 includes a disconnected virtual desktop session associated with the user credential, broker server 608 can send a signal to the virtualization host that has the disconnected session and instruct it to execute the virtual machine. If session database 610 does not have information indicative of a disconnected session for the user, broker server 608 can select a suitable virtual desktop server, e.g., one that has the resources available to instantiate a virtual machine to host a virtual desktop session.

Virtualization platform 502 can instantiate virtual machine 514 and execute guest operating system 528 on a virtual processor. Referring back to FIG. 5, guest operating system 528 can run remote presentation engine 506; return an internet protocol (IP) address of virtual NIC 616 to broker server 608; and await a connection from client 614. Broker server 608 can return the IP address of virtual NIC 616 to client 614 in a packet of information that causes a logical processor of client 614 to redirect client to the IP address virtual machine 514. Gateway 612 can receive the connection request and forward it to virtual NIC 616.

In at least one exemplary embodiment, session manager 508 can be configured to check to see if the client 614 is associated with a valid license before starting the virtual desktop session. Remote presentation engine 506 can receive a license from client 614 (or information associated with a license) and send the information to virtualization platform 502, which can send the license (or the information associated with the license) to licensing server 604. Licensing server 604 can include license validation engine 606, which can be configured to determine whether a license associated with client 614 is valid. If the license is valid, license validation engine 606 can send a signal back virtual desktop server 500 and a virtual desktop session can be started. At this point, remote presentation engine 506 can stream one or more packets of information indicative of a graphical user interface for guest operating system 528 to client 614 and receive one or more packets of information indicative of user input from client 614.

In an exemplary embodiment, when virtualization platform 502 receives a request from broker server 608 to instantiate a virtual machine, virtual desktop manager 530 can execute and send commands and/or information via inter-partition communication channel 504 to virtual machine 514 to cause guest operating system 528 to be configured to conduct a virtual desktop session. Configuration service 534 can receive the commands and/or information and configure guest operating system 528 accordingly. For example, virtual desktop manager 530 can send the identity of the user attempting to connect, desired settings for a firewall protecting guest operating system 528, registry values, a list of applications the user is allowed to operate, commands to enable virtual desktop sessions and to add the identity of the user to a list of authorized virtual desktop users, etc. Configuration service 534 can execute on a virtual processor and change appropriate settings.

Once the virtual desktop session is running, virtual desktop manager 530 can manage a running virtual desktop session via inter-partition communication channel 504. For example, virtual desktop manager 530 can issue commands to virtual machine 514 such as commands that cause the guest operating system 528 to shut down, disconnect the user, reset the guest operating system 528, etc. In the same, or another embodiment, virtual desktop manager 530 can manage the virtual desktop session receive state information for virtual machine 514, status information from remote presentation engine 506, and/or send commands to control the virtual desktop session to configuration service 534. For example, virtual desktop manager 530 can receive state information for virtual machine 514 that indicates whether virtual machine 514 is running, paused, ready, booting, as well as a list of IP addresses that can be sent to the client. In addition, virtual desktop manager 530 can receive status information for guest operating system 528 such as the identity of the user that is logged in for the virtual desktop session, and communicate some or all of this information to broker server 608.

Figure 7:
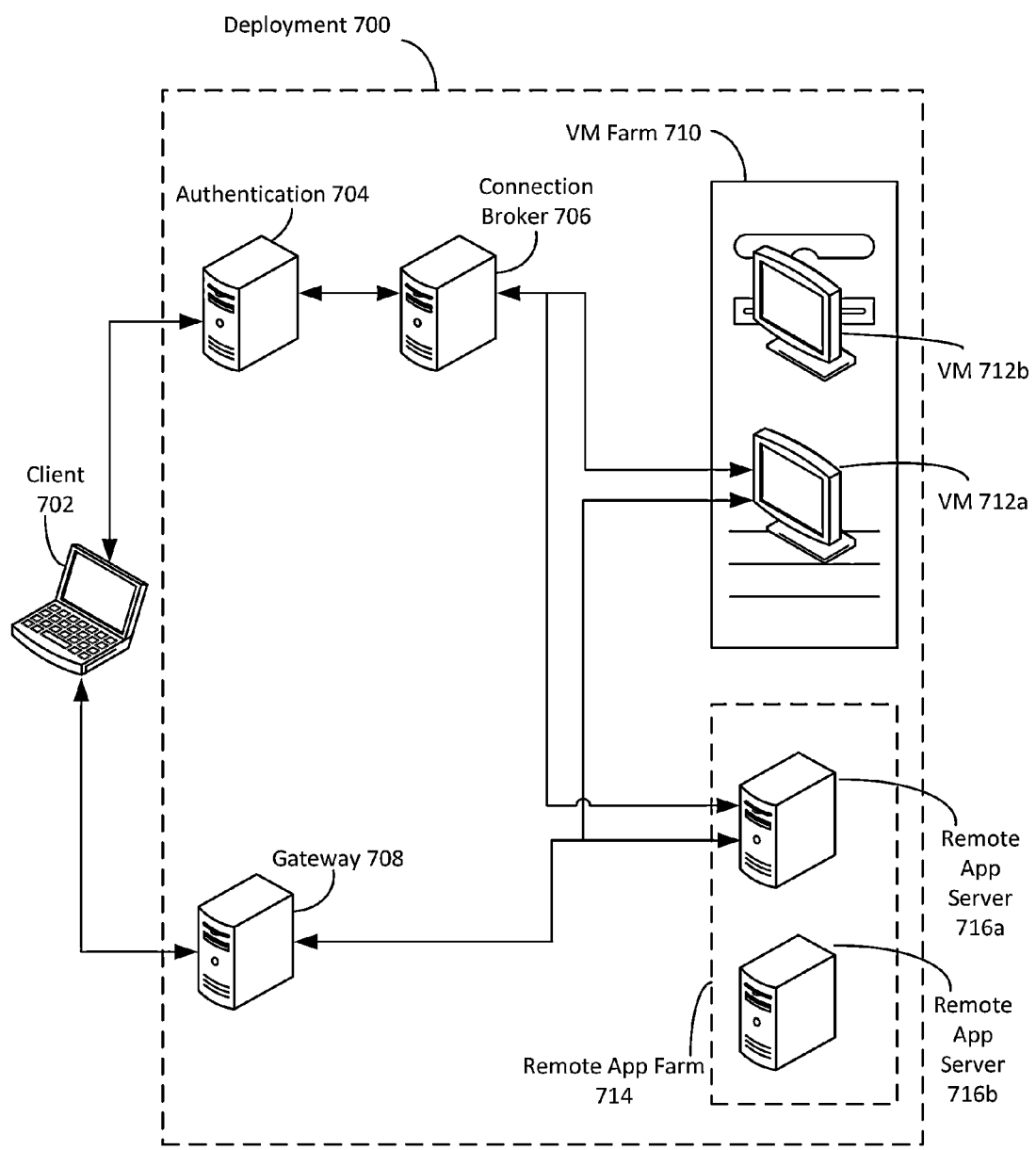
FIG. 7 depicts an operational environment for practicing aspects of the present disclosure.

FIG. 7 depicts an example system where a client has a workspace that comprises remote sessions with a plurality of servers.

The computers depicted in FIG. 7 may be similar to the computer depicted in FIG. 1. In FIG. 7, a client 702 communicates with a deployment 700, which comprises authentication server 704, connection broker 708, gateway 708, remote application server farm 714 (which in turn comprises two homogenously configured servers, remote application servers 716*a-b*), and VM server farm 710 (which in turn comprises two homogenously configured VMs, VMs 712*a-b*).

Client 702 has a workspace that comprises multiple remote resources served by one or more of remote application servers 716 and VMs 712. Client 702 may log into its workspace through an authentication server 704. Once authenticated, the client's request to connect to its workspace is transmitted from authentication server 704 to connection broker 706. Connection broker 706 is configured to broker connections between client 702 and the application servers 716 and VMs 712 that will serve remote resources with client 702, and to effectuate this, connection broker 706 is configured to communicate with application servers 716 and VMs 712 to determine what resources they are currently serving (including disconnected remote resources for a user of client 702).

Client 702 may have a workspace that comprises multiple remote resources—a remote resource comprising a remote application from remote application server 716*a*, and a remote resource that comprises a VM from VM 712*a*. As depicted, client 702 does not have a remote resource with remote application server 716*b* or VM 712*b*. These may each serve different applications or desktops, versions of an application, or other permutations. For instance, remote application server 716*a* may be serving client 702 with a remoted word processor application, and VM 712 may be serving client 702 with a remote desktop.

As can be seen through this depiction, when a user wishes to reconnect back to his or her workspace, he may desire to reconnect to the remote resources of both remote application server 716*a* and VM 712*a* through one command, rather than through one command performed three times. The user may perform this reconnect operation from client 702, or from another client computer (such as where client 702 is the user's computer at work, and the user wishes to reconnect from a computer at home during the weekend).

Figure 8:
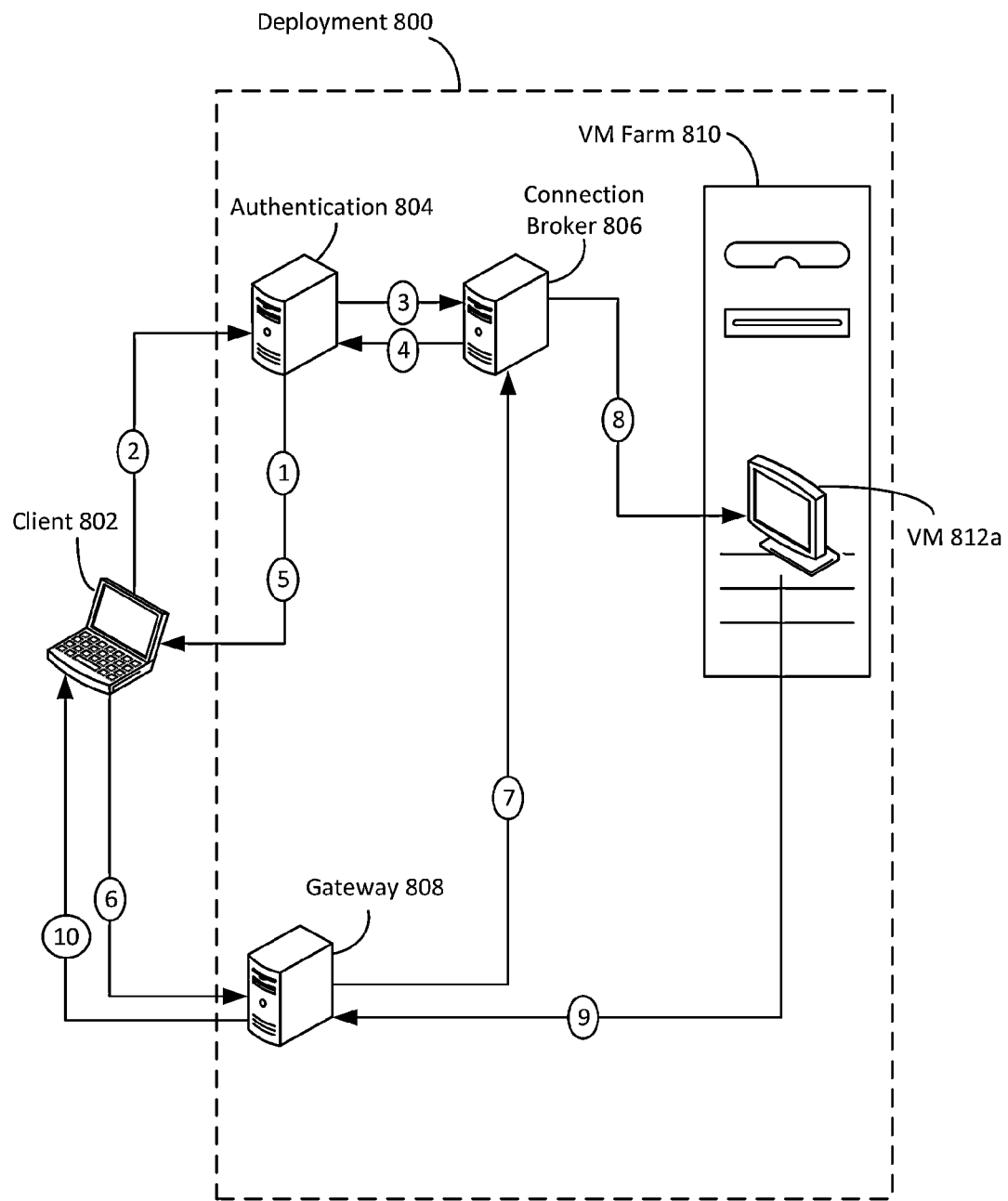
FIG. 8 depicts an operational environment for practicing aspects of the present disclosure.

FIG. 8 depicts an example an example communication flow for a client reconnecting to a remote resource of a workspace.

FIG. 8 depicts an example communication flow in a system where a client reconnects a workspace that comprises remote sessions with a plurality of servers. This communication flow may be effectuated in a system, such as the computer system depicted in FIG. 7. To wit, remote deployment 800, client 802, authentication server 804, connection broker 806, gateway 808, VM farm 810 and VM 812*a* of FIG. 8 may be similar to remote deployment 200, client 202, authentication server 204, connection broker 206, gateway 208, VM farm 210 and VM 212*a*, respectively, of FIG. 7.

A user of client 802 has previously had a workspace to remote server farm 800 that involved accessing a remote resource from VM 812*a*, and this workspace is now disconnected. Before client 802 even attempts to reconnect to the deployment 800, authentication server 804 publishes a document (via communication (1)) to client 802 identifying information about the deployment 800 that client 802 may use to access the remote resources of the deployment 800. Client 802 later reconnects by sending communication (2) to authentication server 804. Authentication server 804 validates credentials of the user and/or client (such as a login and password). Where the credentials are validated, authentication server 804 communicates with connection broker 806 to determine which remote resources (here, VM 812a) client 802 is to reconnect to when reconnecting its workspace. Authentication server 804 makes this determination by sending communication (3) to connection broker 806, and, in response, receiving back in communication (4) a list of server farms (here, VM farm 810) for client 802 to reconnect to. This information indicated in communication (4) is passed by authentication server 804 to client 802 in communication (5).

When client 802 has the list of servers to reconnect to from authentication server 804, client 802 reestablishes a communication with each of those server farms. As depicted in FIG. 8, that server farm is VM farm 810. Client 802 communicates (6) with gateway 808 to access the remote resources of these server farms. Gateway 808 processes communication (6), and in turn communicates (7) with connection broker 806 to convey similar information. Connection broker 806 takes the identification of the server farm from communication (7) and from it, identifies the machine (VM 812a) within the farm 810 that has that disconnected remote resource. Connection broker 806 sends communication (8) to VM 812a, instructing VM 812a to reconnect the remote resource to client 802. VM 812a reconnects with client 802 by sending a communication (9) indicative of the same to gateway 808, which, in turn sends a communication (10) indicative of the same to client 802.

It may be appreciated that this is a simplified diagram to emphasize the present invention, and that more or fewer server farms may be present and/or reconnected to, and that the communications passed may be more involved (for instance, it is shown that communications (9) and (10) establish a reconnection between VM 812a and client 802, where this may also involve communications that are send from client 802 through gateway 808 and to VM 812a).

All of these variations for implementing the above mentioned virtual machines are just exemplary implementations, and nothing herein should be interpreted as limiting the disclosure to any particular virtualization aspect.

Remote Access to Hosted Virtual Machines by Enterprise Users

Many principles and operations derived from cloud data centers may be applicable to enterprise data centers. Such principles may include image based management, rapid and dynamic provisioning of resources, service/application centric management, etc. By application of such principles in their data centers, a paradigm shift in how enterprise IT organizations operate may be enabled.

Disclosed herein are methods and systems that enable enterprise data centers to allocate portions of their infrastructure and assign them to specific line of business (LOB) business unit IT (BUIT) organizations. This allows the BUIT to dynamically and rapidly provision virtual infrastructure as needed to run LOB applications. This can also enable the BUIT to focus more on the development and management of the LOB applications rather than invest significant resources in managing the infrastructure layer.

In various embodiments, methods and systems are disclosed for enabling data center administrators to allocate and assign a portion of their physical infrastructure (Storage, Network and Compute) and exposed them as a virtualized environment to different business unit organizations.

In one embodiment, the following process flow an example implementation for enabling a system for allocating physical infrastructure and exposing a portion of the allocated infrastructure to the BUITs as a service within the enterprise.

1. The data center administrator may install and configure the system level data center configuration, expose the portion of the infrastructure that they want to offer as part of the service and to allow for extensibility authoring. Examples include the VMM server name, network segment, domain, and extensibility scripts.

2. The BUIT administrator may register the business unit name.

3. The BUIT may request allocation of a virtual environment. The request may occur during initial setup and also as a change request.

4. The data center administrator may approve or deny the request.

5. The data center administrator may provision the system with the allocated resources.

6. The data center administrator may provide access to the BUIT's self-service portal to allow access to the BUIT's virtual environment.

7. BUIT users may access the self-service portal and perform virtual machine actions in their virtual environment.

A self-service portal may be a web component that extends management of virtual machines to end users. The self-service portal may be an extensible component built on top of a virtualization system. The system can be used to pool, allocate, and manage resources to offer infrastructure as a service and to deliver the foundation for a private cloud platform inside the enterprise. The self-service portal extends the assignment of virtual machines to end users. The self-service portal may include a web-based user interface that includes sections for datacenter managers and business unit IT consumers. The self-service portal may include a dynamic provisioning engine, and may reduce the time needed to provision infrastructures and their components by offering business unit on-boarding and infrastructure request and change management. Some embodiments may provide reporting via a dashboard display that allows users to view data such as configuration, chargeback, and utilization.

In an embodiment, an engine may be provided that brokers the execution of actions and tasks to the appropriate infrastructure. The engine may further comprise functions and capabilities as follows.

The engine may provide various interfaces to exposes its services. In one embodiment in the Windows environment, the API can be the Windows Communication Foundation (WCF) which is an API in the .NET Framework for building connected service-oriented applications. The WCF services may be provided for interoperability with cross platform systems.

Figure 10:
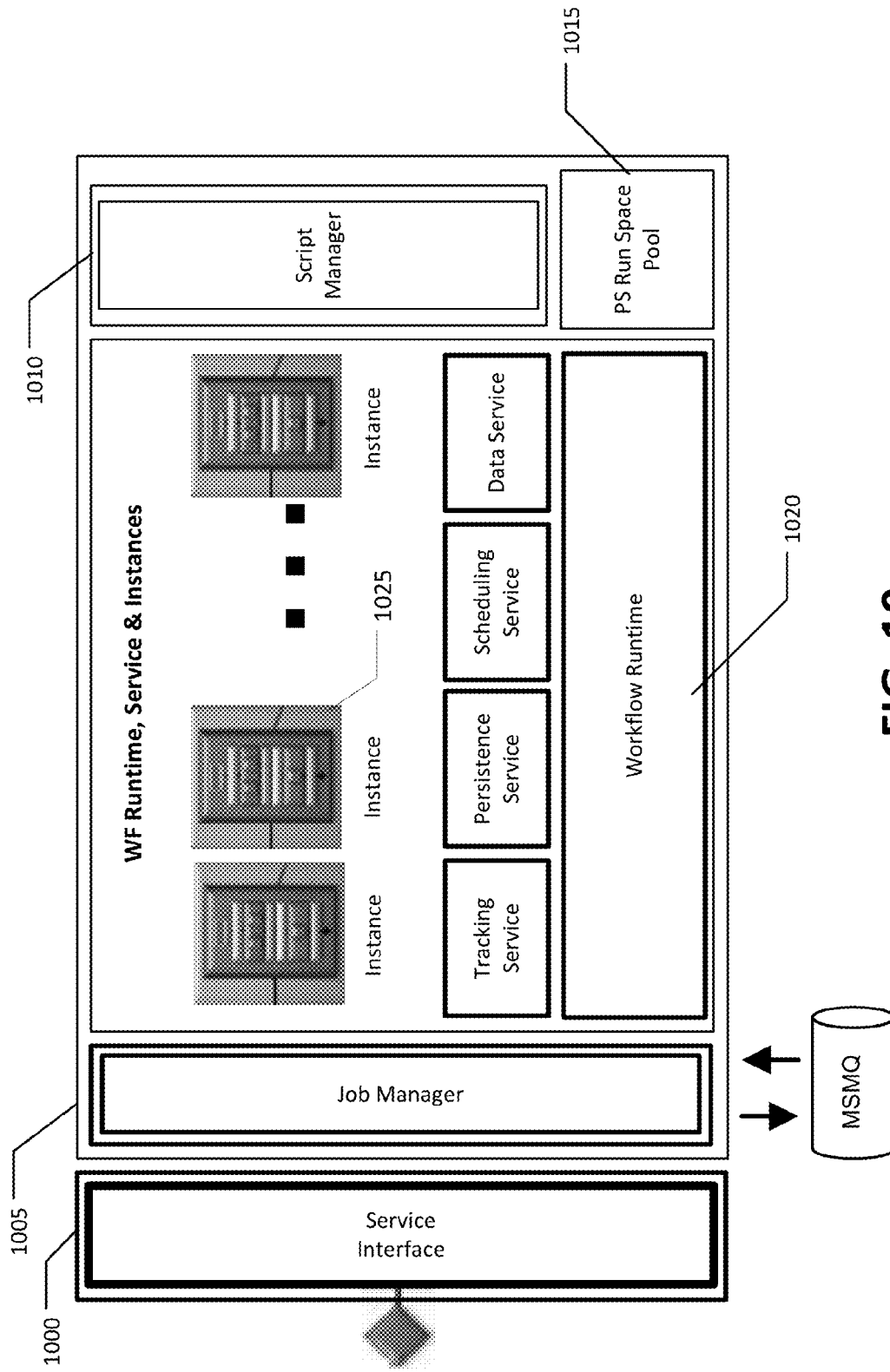

The engine may comprise a throttling and queuing mechanism, which may further comprise a job manager component. Referring to FIG. 10, a job manager 1005 may be configured to determine if a requested job can be processed. In one embodiment the determination may be made as follows.

Let x be the number of workflows currently being executed by a runtime 1020.

Let y be the number of jobs in the queue.

Let T be the maximum number of jobs that the system is configured for.

Let U be the number of new jobs to be processed.

If T−(x+y)>U then the job manager may accept the request. If T−(x+y)<U then the job manager may reject the request.

Once accepted, the job manager may queue the requested jobs in a message queue. When a job can be executed, the job manager may retrieve the next job from the message queue and create an instance of a workflow template. The workflow template can be scheduled for execution by the workflow runtime.

The job manager may implement queues with different priorities and place actions into the priority queues to throttle the execution of actions. "Light" virtual machine actions such as starting, stopping, and storing virtual machines may be stored into a high priority queue, while "heavy" virtual machine actions such as creating a virtual machine may be stored in a normal priority queue.

In an embodiment, a task automation framework may be used for system administration. Such a framework may further implement a scripting language such as Windows PowerShell. PowerShell (PS) is a command-line shell and associated scripting language built on top of, and integrated with, the .NET Framework. Administrative tasks are generally performed by cmdlets that implement a particular operation. Sets of cmdlets may be combined together in scripts.

Referring again to FIG. 10, in an embodiment, once the job manager 1005 creates and executes a workflow instance 1025, the job manager 1005 may traverse the task in each action XML which may be associated with multiple scripts. The job manager may further dynamically wrap the scripts for each task as a workflow activity, add the activity into the workflow sequence activity, and schedule the workflow instance for execution.

For execution of each of the workflow activities, the job manager 1005 may call a script manager 1010. The script manager 1010 may be configured to host the PS run space pool 1015 and spawn a PS run space from the PS run space pool 1015. The script manager 1010 may further be configured to execute the PS script. While this is happening the workflow can be persisted until the calls return.

In the context of the execution of VMM cmdlets, the script manager 1010 may further be configured to check for available connections, established one connection, and reuse the connection for all actions. The script manager 1010 may further ensure atomic execution of the virtual machine placement to ensure accurate placement. In one embodiment this can be accomplished by providing the ability to call portions of the script in a lock. The script manager 1010 may limit of the number of virtual machines per host to reduce the risk of failure occurrences.

Data can be passed between several components within the engine—from job manager to workflow, from workflow to workflow activities, from a workflow script activity to the script manager, and from the output of a script activity to the input of another script activity as a script parameter. Furthermore, passing secured credentials may be performed as a secured string.

Each PS script that is associated with a task may require input parameters that can be hardcoded at authoring time. Alternatively, the engine's data item can be referenced and can be evaluated at runtime. A data item can be an XML blob that holds the environment data, user specified data based on the job requested, and other data that is needed by the job to execute but not specified by the user. The data item may serve as the data repository for a workflow and all of its activities. The workflow activities may rely on the data item for any input that the activities may need. The data item may be kept simple and thus not change based on the job being requested. However, in other embodiments the data item schema can be expanded to include child data items and to allow a data item per each type of job being requested.

The engine may further be configured to enable persisting and passing of the task script's output parameters to different task scripts. In one embodiment the engine may create a new "Output" section in the data item containing the task name and a property bag of each of its outputs in a hierarchical structure. The user can use the user interface to bind the output (task.param(x)) to the input of other task script activities.

The output parameters can be configured to be either a simple type or a complex type. Simple types may be stored in the data item. Complex types may be stored in a collection in the data service and a placeholder reference to the complex type may be added to the data item so that the activity can actually extract the complex type's value when required.

Figure 9:
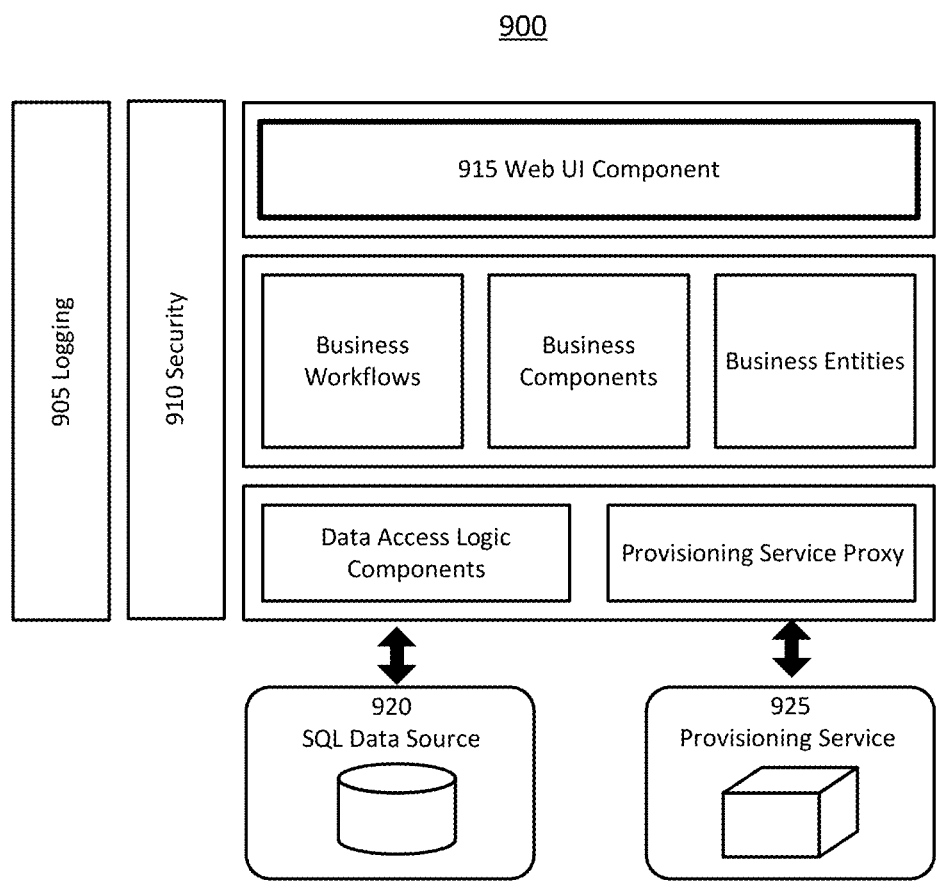
FIGS. 9 and 10 illustrate an example operational procedure for practicing aspects of the present disclosure.

Referring to FIG. 9, in various embodiments a user interface 915 may be provided to allow for on-boarding, provisioning, and extensibility of virtual machine action abstraction. In one embodiment, the user interface entities and their relationships may be structured to embody a one-to-many relationship. For example, the end to end system may have a 1 to M relationship with the data center. The data center may in turn have a 1 to M relationship with the infrastructure. The infrastructure may in turn have 1 to M relationship with the infrastructure service. The infrastructure service may have a 1 to M relationship to the service role. Finally, the service role may have 1 to M relationship with the virtual machines.

In an embodiment, when the administrator is performing configuration actions, the administrator may be provided the capability to configure reservation based and allocation based chargebacks. Chargebacks may include the return of funds to business unit or a reversal of a prior outbound transfer of funds based on the requested, allocated and used resources. Chargebacks may also include providing a monetary amount value for a quota of reserved and allocated resources based on memory, storage and virtual machine templates.

In various embodiments, data driven UI extensibility capabilities may be provided.
1. The user may define additional actions
  a. The data center IT administrator (DCIT Admin), as part of authoring the action XML, can define additional action(s) that the end user can perform.
  b. As part of authoring, the DCIT Admin may define tasks for new actions and a UI name for the action.
  c. When the end-user selects a virtual machine to perform any actions, the UI may read the action XML and display and execute new actions based on the action XML associated with the virtual machine.
2. Allow the user to define run time parameters for actions
  a. The DCIT Admin, as part of authoring the action XML, can define additional runtime parameters (key value pair) and the UI name for the key for the actions.
  b. The DCIT Admin can additionally define default values to the key and bind these parameters to the scripts that define the tasks.
  c. When the end-users select a virtual machine to perform any actions, the UI may be extended to display these runtime key value pair parameters with default values. The end-user can then overwrite these values with user specific values which can be added into the data item as part of the action execution.

In an embodiment, the user interface may provide the following user interface components. A registration user interface may be provided that the BUIT uses to register their organization into the system. An on-boarding user interface may be provided to request an initial allocation of their virtual environment or as a set of change requests.

A configuration user interface may be provided that the data center administrator may use to configure the data center allocation for different BUITs, configure extensibility, configure the self-service portal branding/logo, and perform maintenance related tasks for the system itself. A provisioning user interface may be provided that the data center administrator may use to provision an allocated system for the requesting BUIT.

A role-based access control user interface may be provided for the administrator to manage role based access to the system. The self-service portal user interface may be provided for the BUIT to access the virtual environment that has been allocated by the data center administrator. Finally, an extensibility/authoring user interface may be provided for the data center administrator to add/remove/edit virtual machine actions and tasks associated with each virtual machine action. This user interface may also be used to add/remove/edit scripts and corresponding parameters associated with each task.

In various embodiments, an extensibility model may be provided at a plurality of levels. Users may be enabled to add/remove/modify virtual machine actions. Each action may correspond to a virtual machine template and associated actions. The configuration may be stored in an XML blob.

Another extensibility level may be expressed as tasks. Virtual machine actions may contain one or more tasks and a user may add/remove/modify tasks for each virtual machine action. Each task may result in one workflow activity.

Yet another extensibility level may be expressed as scripts. For example, each task may be associated with one PS script and one or more of the following properties.

Continue on Error—This property can have a value of true or false. If set to true, any script errors including timeout errors may be considered non-fatal and workflow execution may continue in spite of the error. If set to false, any error (be it script or timeout) may be considered a terminal error and the workflow may be aborted. In one embodiment this value may be assigned a default value of false (to terminate workflow on error).

Success Code List—This may be a list of known success codes that a script can output. In one embodiment, this may be an optional parameter. If not specified, the script return code evaluation can be ignored. It may be assumed that the script succeeded unless an exception was raised. Multiple success codes may be separated by a comma separating them. In order to evaluate the output from a script, only the first return value from the pipeline may be considered (script evaluations may be performed using Power Shell). If a script returns multiple values, all except the first return value may be ignored.

Parameter—This may be an input parameter to a task. A type need not be specified as part of the parameter because ultimately everything will be passed in as a string unless the input parameter being referred to is an output from a previous task. If the current input parameter is an output from a previous task, then whatever its type, it may be directly added as a parameter. A parameter may have a name and a value. The value may be the value of the parameter node but not an attribute on the parameter node. A parameter can be defined in one of three ways:

A constant—this can be a literal or a hard coded value.

An XPath expression—this can be a placeholder that is replaced with an actual value at runtime.

Output from a previous task—this may be a placeholder that is replaced with an actual value at runtime.

Script Type—The system may support multiple script types and carry out script execution using scripting languages such as Power Shell. Supported script types may include but not limited to Command Script, VB Script, and Power Shell Script.

Script Body—The script content may be copied and pasted into a field.

Locked Script Body—This is a section in which the script content may be called in a lock.

SnapIns—This parameter may be provided if the Script Type is set to Power Shell Script.

IsEnabled—This parameter may take a Boolean value (true/false). During design/authoring time, the user may determine whether a specific task should be enabled or disabled. This can be done through the configuration user interface if implemented or directly in notepad (XML handling).

TimeoutSeconds—If this value is not set, the task may be treated as an asynchronous task and not terminated at all. However, the workflow instance may be terminated after workflow timeout has occurred.

In one embodiment the data item schema may be as follows.

```
<?xml version="1.0" encoding="utf-8" ?>
 <DataItem>
  <Configuration>
   <DataCenter>
    <ID />
    <Name />
    <DCITAdmin />
   </DataCenter>
   <VMMServer>
    <ID />
    <FQDN />
   </VMMServer>
   <BusinessUnit>
    <ID />
    <UnitCode />
    <DisplayName />
    <BUITAdmin />
   </BusinessUnit>
   <Infrastructure>
    <ID />
    <Name />
    <ForecastedMemoryQuotaInGB />
    <ForecastedStorageQuotaInGB />
    <ForecastedDecommissionDate />
   </Infrastructure>
   <Service>
    <ID />
    <Name />
    <AllocatedMemoryQuotaInGB />
    <AllocatedStorageQuotaInGB />
    <AvailableMemoryQuotaInGB />
    <AvailableStorageQuotaInGB />
    <ReservedMemoryQuotaInGB />
    <ReservedStorageQuotaInGB />
    <EnvironmentTypeID />
    <EnvironmentTypeName />
    <MemoryCostPerGBPerDay />
    <StorageCostPerGBPerDay />
    <BillingCode />
    <StoreInLibraryID />
    <StoreInLibraryServer />
    <StoreInLibraryShare />
   <HostGroup>
    <ID />
    <HostGroupGuid />
    <HostGroupName />
   </HostGroup>
   <SAN>
    <ID />
    <Name />
```

```
          <DeviceID />
        </SAN>
      </Service>
      <ServiceRole>
        <ID />
        <Name />
      </ServiceRole>
      <Job>
        <ID />
        <JobGuid />
        <SubmittedBy />
        <SubmittedDate />
        <TemplateID-Deprecated />
        <JobIndex />
        <JobType>
          <ID />
          <Name />
          <AssemblyName />
          <ClassName />
        </JobType>
      </Job>
      <VMTemplate>
        <ID />
        <Guid />
        <LibraryShareID />
        <LibraryServerGuid />
        <LibraryShare />
        <OS />
        <RAM />
        <Storage />
        <CPU />
        <CPUType />
        <DisplayName />
        <IsCustom />
        <IsShared />
        <CostPerDay />
      </VMTemplate>
    </Configuration>
    <ActionData>
      <VirtualMachine>
        <ID />
        <Guid />
        <Name />
        <AllocatedMemoryQuota />
        <AllocatedStorageQuota />
        <Network>
          <VLANID />
          <Name />
          <HyperVNetworkName />
          <IsVLANEnabled />
          <IsStaticMAC />
          <HighAvailability />
          <IsDomainJoined />
          <StartIPAddress />
          <EndIPAddress />
          <IP>
            <IPAddress />
            <DefaultGateWay />
            <SubnetMask />
            <MACAddress />
            <IsIPStatic />
            <DNSServer />
          </IP>
          <LoadBalancer>
            <Name />
            <DeviceId />
            <Port />
            <VIPPool />
          </LoadBalancer>
        </Network>
        <Domain>
          <ID />
          <Name-Deprecated />
          <FQDN />
        </Domain>
      </VirtualMachine>
    </ActionData>
    <Output />
  </DataItem>
```

In an embodiment, an actions XML schema may be as follows.

```
<?xml version="1.0" encoding="utf-8"?>
<xs:schema attributeFormDefault="unqualified" elementFormDefault="qualified" xmlns:xs="http://www.w3.org/2001/XMLSchema">
  <xs:element name="Actions">
    <xs:complexType>
      <xs:sequence>
        <xs:element maxOccurs="unbounded" name="Action">
          <xs:complexType>
            <xs:sequence>
              <xs:element name="Task">
                <xs:complexType>
                  <xs:sequence>
                    <xs:element name="Parameters">
                      <xs:complexType>
                        <xs:sequence>
                          <xs:element maxOccurs="unbounded" name="Parameter">
                            <xs:complexType>
                              <xs:simpleContent>
                                <xs:extension base="xs:string">
                                  <xs:attribute name="name" type="xs:string" use="required" />
                                </xs:extension>
                              </xs:simpleContent>
                            </xs:complexType>
                          </xs:element>
                        </xs:sequence>
                      </xs:complexType>
                    </xs:element>
                    <xs:element name="ScriptType" type="xs:string" />
                    <xs:element name="ScriptBody" type="xs:string" />
                    <xs:element name="LockScriptBody" type="xs:string" />
                    <xs:element name="SnapIns" />
                    <xs:element name="TimeoutSeconds" type="xs:unsignedShort"
```

-continued

```
/>
            </xs:sequence>
            <xs:attribute name="name" type="xs:string" use="required"
/>
            <xs:attribute name="description" type="xs:string"
use="required" />
            <xs:attribute name="isEnabled" type="xs:boolean"
use="required" />
            <xs:attribute name="continueOnError" type="xs:boolean"
use="required" />
            <xs:attribute name="successCodeList" type="xs:unsignedByte"
use="required" />
            <xs:attribute name="ID" type="xs:string" use="required" />
          </xs:complexType>
        </xs:element>
      </xs:sequence>
      <xs:attribute name="ID" type="xs:string" use="required" />
      <xs:attribute name="name" type="xs:string" use="required" />
      <xs:attribute name="description" type="xs:string" use="required"
/>
    </xs:complexType>
  </xs:element>
    </xs:sequence>
  </xs:complexType>
 </xs:element>
</xs:schema>
```

Figure 11:
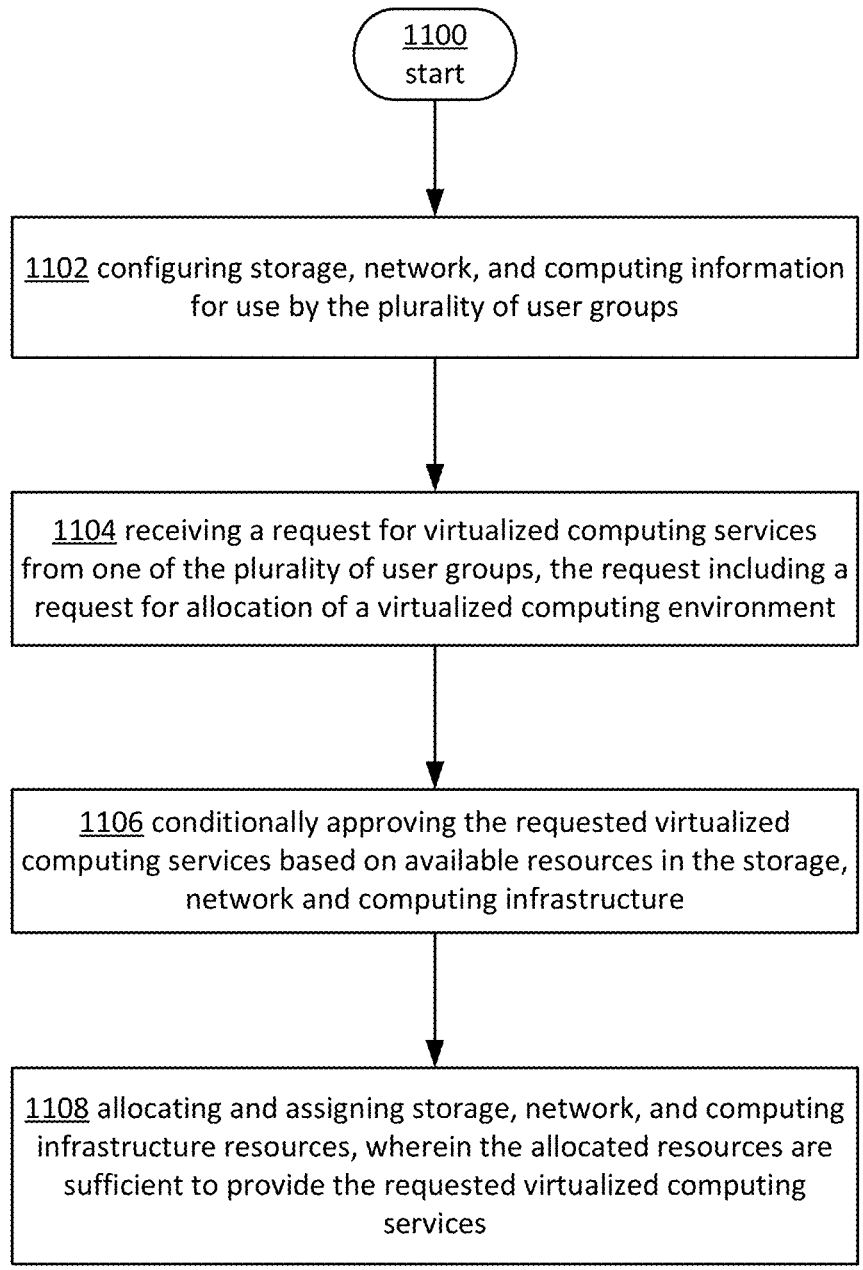
FIG. 11 illustrates an example operational procedure for practicing aspects of the present disclosure.

FIG. 11 depicts an exemplary operational procedure for allocating storage, network and computing infrastructure as a virtualized computing environment to a plurality of user groups including operations 1100, 1102, 1104, 1106, and 1108. Referring to FIG. 11, operation 1100 begins the operational procedure and operation 1102 illustrates configuring storage, network, and computing information for use by the plurality of user groups. Operation 1104 illustrates receiving a request for virtualized computing services from one of the plurality of user groups, the request including a request for allocation of a virtualized computing environment. Operation 1106 illustrates conditionally approving the requested virtualized computing services based on available resources in the storage, network and computing infrastructure. Operation 1108 illustrates allocating and assigning storage, network, and computing infrastructure resources, wherein the allocated resources are sufficient to provide the requested virtualized computing services.

Figure 12:
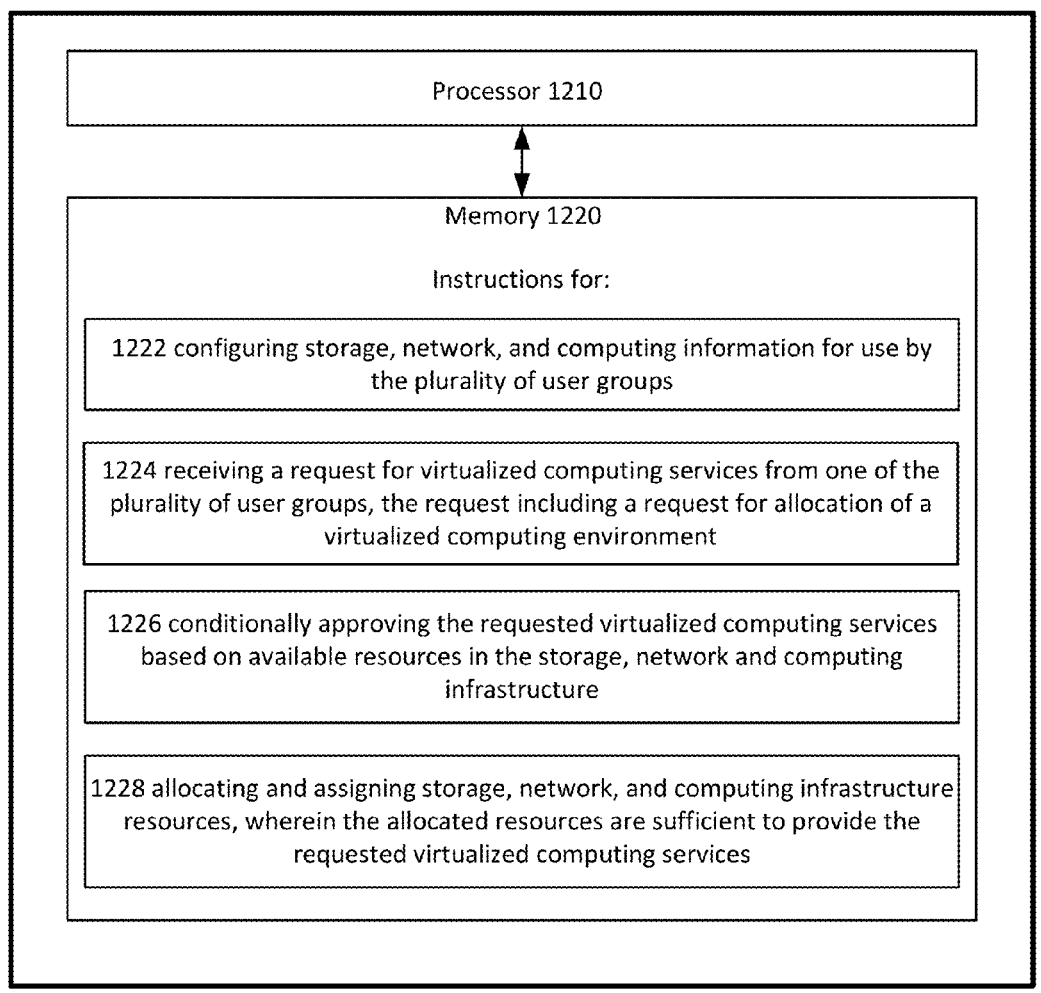
FIG. 12 illustrates an example system and operational procedure for practicing aspects of the present disclosure.

FIG. 12 depicts an exemplary system for allocating storage, network and computing infrastructure as a virtualized computing environment to a plurality of user groups as described above. Referring to FIG. 12, system 1200 comprises a processor 1210 and memory 1220. Memory 1220 further comprises computer instructions configured to allocate storage, network and computing infrastructure as a virtualized computing environment to a plurality of user groups. Block 1222 illustrates configuring storage, network, and computing information for use by the plurality of user groups. Block 1224 illustrates receiving a request for virtualized computing services from one of the plurality of user groups, the request including a request for allocation of a virtualized computing environment. Block 1226 illustrates conditionally approving the requested virtualized computing services based on available resources in the storage, network and computing infrastructure. Block 1228 illustrates allocating and assigning storage, network, and computing infrastructure resources, wherein the allocated resources are sufficient to provide the requested virtualized computing services.

Any of the above mentioned aspects can be implemented in methods, systems, computer readable media, or any type of manufacture. For example, a computer readable medium can store thereon computer executable instructions for allocating storage, network and computing infrastructure as a virtualized computing environment to a plurality of user groups. Such media can comprise a first subset of instructions for configuring storage, network, and computing information for use by the plurality of user groups; a second subset of instructions for receiving a request for virtualized computing services from one of the plurality of user groups, the request including a request for allocation of a virtualized computing environment; a third subset of instructions for conditionally approving the requested virtualized computing services based on available resources in the storage, network and computing infrastructure; and a fourth subset of instructions for allocating and assigning storage, network, and computing infrastructure resources, wherein the allocated resources are sufficient to provide the requested virtualized computing services. It will be appreciated by those skilled in the art that additional sets of instructions can be used to capture the various other aspects disclosed herein, and that the two presently disclosed subsets of instructions can vary in detail per the present disclosure.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A method for allocating physical storage, networking and computing infrastructure of an enterprise data center as a private virtualized computing environment to a plurality of user groups of the enterprise, the method comprising:
   allowing access to the private virtualized computing environment via one or more communications networks to the plurality of user groups of the enterprise;
   providing a user interface for registering the plurality of user groups and submitting requests for virtualized computing services, the private virtualized computing environment instantiated on the physical storage, networking and computing infrastructure of the enterprise data center, the user groups belonging to the enterprise;
   receiving, from one of the plurality of user groups, a request for virtualized computing services, the request including a request for allocation of a virtualized computing environment;
   conditionally approving the requested virtualized computing services based on available resources in the physical storage, networking and computing infrastructure and pending tasks in the infrastructure, a maximum capacity of the virtualized computing environment, and an estimated workload to provide the requested virtualized computing services; and
   allocating and assigning computing infrastructure resources from the physical storage, networking and computing infrastructure, wherein the allocated and assigned computing infrastructure resources comprise portions of the physical storage, networking and computing infrastructure that have a capacity to provide the requested virtualized computing services.

2. The method of claim 1, wherein the user interface is a self-service portal configured to provide access to the requested virtualized computing services.

3. The method of claim 2, further comprising allowing inflation or deflation of the allocated and assigned computing infrastructure resources via the self-service portal.

4. The method of claim 1, wherein the private virtualized computing environment provides extensibility authoring for implementing virtual machine actions.

5. The method of claim 1, wherein the virtualized computing environment comprises a hierarchical relationship between the physical storage, networking and computing infrastructure, virtualized computing services, service roles, and virtual machines.

6. The method of claim 1, further comprising brokering execution of tasks to provision the allocated and assigned computing infrastructure resources.

7. The method of claim 1, further comprising determining that the request can be processed as a function of a number of pending tasks in a message queue, a maximum number of jobs that the virtualized computing environment is configured for, and a number of jobs to be processed to execute the request.

8. The method of claim 1, further comprising:
   queuing jobs to be processed in a message queue;
   retrieving a job from the message queue;
   creating instances of workflow templates based on the retrieved job;
   creating a workflow activity; and
   scheduling the instances for execution.

9. The method of claim 8, further comprising:
   associating a virtual machine action with a workflow template;
   generating tasks and configuration information for the virtual machine action; and executing the tasks.

10. The method of claim 1, further comprising exposing a portion of the physical storage, networking and computing infrastructure to the plurality of user groups.

11. The method of claim 1, wherein the user interface implements dashboard reporting and chargeback reporting.

12. A system for allocating physical storage, networking and computing infrastructure of an enterprise data center as a private virtualized computing environment to a plurality of business units of the enterprise, the system comprising:
   a computing device comprising at least one processor;
   a memory communicatively coupled to said processor when said system is operational;
   said memory having stored therein computer instructions that upon execution by the at least one processor, at least cause the system to:
   allow access to the private virtualized computing environment via one or more communications networks to the plurality of business units of the enterprise;
   provide a user interface for registering the plurality of business units and submitting requests for virtualized computing services, the private virtualized computing environment instantiated on the physical storage, networking and computing infrastructure of the enterprise data center, the business units belonging to the enterprise;
   receive a request for virtualized computing services from one of the plurality of business units, the request including a request for allocation of a virtualized computing environment;
   conditionally approve the requested virtualized computing services based on available resources in the physical storage, networking and computing infrastructure, including pending tasks in the infrastructure, a maximum capacity of the virtualized computing environment, and an estimated workload to provide the requested virtualized computing services; and
   allocate and assign computing infrastructure resources, wherein the allocated and assigned computing infrastructure resources comprise portions of the physical storage, networking and computing infrastructure that are estimated to have a capacity to provide the requested virtualized computing services.

13. The system of claim 12, wherein the user interface is a self-service portal configured to provide access to the requested virtualized computing services.

14. The system of claim 12, further comprising computer instructions that upon execution by the at least one processor, at least cause the system to author and configure tasks that implement virtual machine actions.

15. The system of claim 12, wherein the user interface is configured to depict a hierarchical relationship between the physical storage, networking and computing infrastructure, virtualized computing services, service roles, and virtual machines implementing the virtualized computing environment.

16. The system of claim 12, further comprising computer instructions that upon execution by the at least one processor, at least cause the system to broker execution of tasks to provision the allocated and assigned virtualized infrastructure.

17. The system of claim 12, further comprising computer instructions that upon execution by the at least one processor, at least cause the system to determine that the request can be processed as a function a number of pending tasks in a message queue, a maximum number of jobs that the virtualized computing environment is configured for, and a number of jobs to be processed to execute the request.

18. A computer readable storage medium storing thereon computer executable instructions for allocating physical storage, networking and computing infrastructure of an enterprise data center operated by an enterprise as a private virtualized computing environment to a plurality of business units of the enterprise, said instructions for:

allowing access to the private virtualized computing environment via one or more communications networks to the plurality of business units of the enterprise;

providing a user interface for registering the plurality of business units and submitting requests for virtualized computing services, the private virtualized computing environment instantiated on the physical storage, networking and computing infrastructure of the enterprise data center, the business units belonging to the enterprise;

receiving a request for virtualized computing services from one of the plurality of business units, the request including a request for allocation of a virtualized computing environment;

conditionally approving the requested virtualized computing services based on available resources in the physical storage, networking and computing infrastructure, including pending tasks in the infrastructure, a maximum capacity of the virtualized computing environment, and an estimated workload to provide the requested virtualized computing services; and allocating and assigning computing infrastructure resources, wherein the allocated and assigned computing infrastructure resources comprise portions of the physical storage, networking and computing infrastructure that are reserved in order to provide the requested virtualized computing services.

19. The computer readable storage medium of claim 18, further comprising instructions for brokering execution of tasks to provision the allocated and assigned virtualized infrastructure.

20. The computer readable storage medium of claim 18, wherein said instructions for conditionally approving further comprise instructions for determining that the request can be processed as a function of a maximum number of jobs that the virtualized computing environment is configured for and a number of jobs to be processed to execute the request.

* * * * *